Nov. 20, 1956  M. F. PETERS  2,771,095
METAL BELLOWS FORMATION
Filed Jan. 2, 1951

INVENTOR
Melville F. Peters
by Albert F. Kronman
ATTORNEYS

United States Patent Office 2,771,095
Patented Nov. 20, 1956

2,771,095

METAL BELLOWS FORMATION

Melville F. Peters, East Orange, N. J.

Application January 2, 1951, Serial No. 203,901

2 Claims. (Cl. 137—796)

This invention relates to the formation of metal bellows and particularly to the contouring of metal membranes which serve as successive elements in a complete bellows assembly.

In my United States patent application, No. 200,561, filed December 13, 1950 and patented January 10, 1956, Patent Number 2,730,562, there is described a method of forming bellows membranes by subjecting the unsupported surface of the unformed membrane to fluid pressure. The form of the finished membrane resulting from the method set forth in my prior application was described as having a curvature of surface of minimum stress.

I have discovered that in order to provide bellows elements with the strength necessary to withstand pressures heretofore unattainable, certain relationships must exist between the shape of the curvature of the bellows membrane and the remainder of the membrane structure.

Accordingly, it is an object of the present invention to provide metal bellows membranes of a cross sectional contour which will withstand high pressures.

Another object of the present invention is to provide high pressure bellows formed of a plurality of bellows elements having a desired cross sectional contour.

A feature of the present invention is its use of flat marginal flanges lying in the same plane.

Another feature of the present invention is its use of a bellows membrane having a cross sectional contour hereinafter referred to as a curvature of surface of minimum stress.

The invention consists of the construction, combination and arrangement of parts, as herein illustrated, described and claimed.

In the accompanying drawings, forming a part hereof is illustrated one form of embodiment of the invention, and in which.

Figure 2:
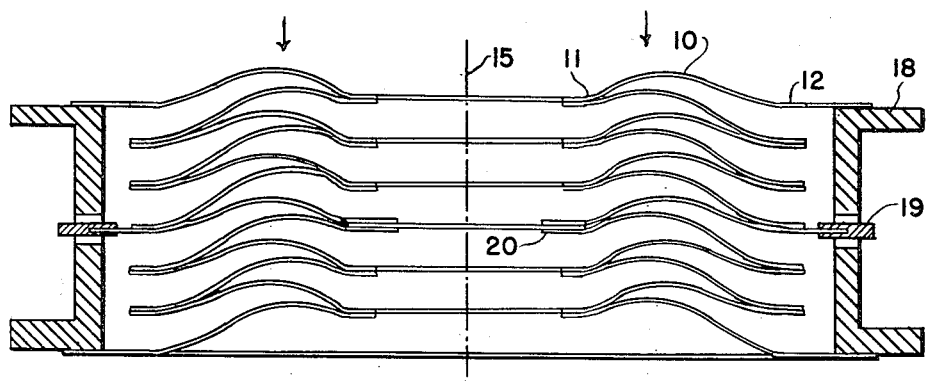
Figure 2 is a cross-sectional view of a complete bellows made in accordance with the present invention showing the use of auxiliary sealing means.
Figure 1:
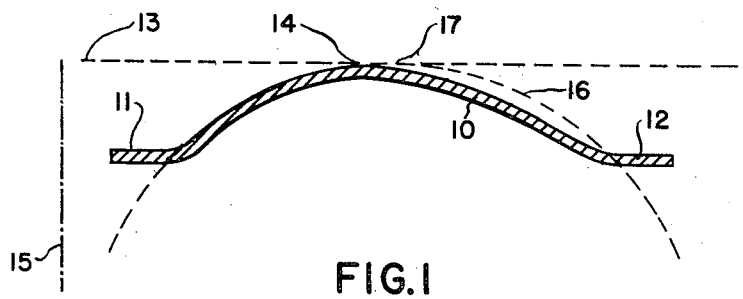
Figure 1 is a fragmentary radial cross sectional view of a bellows membrane somewhat enlarged with the arc of a circle diagrammatically superposed thereon in dashed lines.
Figure 3:
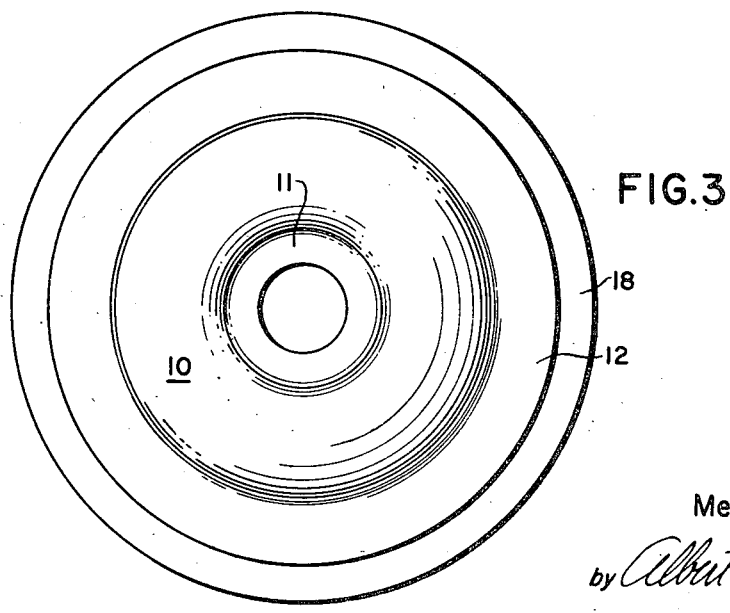
Figure 3 is a view in front elevation of the bellows shown in Figure 2, looking in the direction of the arrows.

Referring to the drawings and particularly to Figures 1 and 2, 10 indicates a bellows membrane formed of some suitable metal such as sheet metal. The membrane 10 is formed with a precise cross sectional shape best shown in Figure 1, for the purpose of imparting great pressure resisting properties thereto. The cross sectional shape of the membrane 10 can best be described with reference to the flat peripheral flanges 11, 12, which are formed on the inner and outer margins of the bellows membrane 10. The flanges 11, 12, lie in the same plane.

The cross sectional shape of the bellows curve made according to the present invention is such, that a line 13, drawn parallel to the flanges 11, 12, will have tangency with the said curve at only one point, 14. For all bellows, except those of a theoretically infinite diameter, the cross sectional shape of the curve will be asymmetrical. I have also found that the point of tangency, 14, must lie on the bellows curve between the longitudinal axis of the bellows shown at 15 in Figures 1, 2, and the midpoint of an arc drawn between the ends of the cross sectional curve. An arc 16 has been drawn in dashed lines in Figure 1 and the point of tangency 17 with the line 13 indicated to show the difference between the desired cross sectional shape and a symmetrical arcuate form.

While it is to be understood that the precise shape of a bellows membrane will vary due to its size, material of which it is made, depth of curvature and the like, the foregoing statements will hold true for the bellows described herein.

A plurality of formed bellows membranes 10 may be welded together at the flanges 11, 12, as shown in Figure 2, to form a complete bellows assembly. To this assembly may be secured auxiliary sealing means 18, 19, 20. The membranes are alternately secured at their flanges 11, 12 to adjacent membranes to form a bellows assembly capable of confining or excluding fluids.

It has been found that bellows membranes having a cross sectional curvature in accordance with the foregoing description are capable of withstanding pressures far in excess of those formerly known in the art and to be practically free of hysteresis when subjected to high pressures. The entire class of cross sectional curve shapes which fall within the above description I have called curvatures of surfaces of minimum stress because of their pressure resisting properties.

Having thus fully described the invention, what is claimed as new and desired to be secured by Letters Patent of the United States, is:

1. A bellows membrane consisting of a single sheet of metal having inner and outer edges, flat flanges on each edge with the flanges being disposed in the same plane and an asymmetrically curved portion joining said flanges, the curve being generally arcuate and tangent at one point to a line drawn parallel to the plane of the flanges and said point of tangency lying intermediate the midpoint of said curve and the juncture of the inner flange and curved portion.

2. A high pressure bellows consisting of a plurality of flanged bellows membranes having flat flanges at their edges, said flanges of each membrane lying in a common plane and alternately secured together at their flanged portions, each membrane consisting of a single sheet of metal and the aforesaid flanges and an asymmetrically curved portion joining said flanges, the curve being generally arcuate and tangent at one point to a line drawn parallel to the plane of the flanges and said point of tangency lying intermediate the midpoint of said curve and the juncture of the inner flange and curved portion.

References Cited in the file of this patent

UNITED STATES PATENTS

| Number | Name | Date |
|---|---|---|
| 82,276 | Belleville | Sept. 22, 1868 |
| 1,141,360 | Rudd | June 1, 1915 |
| 1,195,133 | Dalen | Aug. 15, 1916 |
| 2,117,219 | Shaw | May 10, 1938 |
| 2,145,937 | Lockwood | Feb. 7, 1939 |
| 2,223,691 | Lockwood | Dec. 3, 1940 |
| 2,467,883 | Edwards | Apr. 19, 1949 |
| 2,522,401 | Rava | Sept. 12, 1950 |
| 2,531,243 | Albert | Nov. 21, 1950 |

FOREIGN PATENTS

| Number | Country | Date |
|---|---|---|
| 387,902 | Great Britain | of 1933 |
| 451,379 | Great Britain | of 1936 |
| 500,968 | Great Britain | of 1939 |
| 795,326 | France | of 1936 |